(12) United States Patent
Shinohara

(10) Patent No.: US 8,919,151 B2
(45) Date of Patent: Dec. 30, 2014

(54) PROCESS FOR PRODUCING GLASS MATERIAL GRANULES AND PROCESS FOR PRODUCING GLASS PRODUCT

(71) Applicant: Asahi Glass Company, Limited, Chiyoda-ku (JP)

(72) Inventor: Nobuhiro Shinohara, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 37 days.

(21) Appl. No.: 13/801,032

(22) Filed: Mar. 13, 2013

(65) Prior Publication Data

US 2013/0247617 A1 Sep. 26, 2013

Related U.S. Application Data

(63) Continuation of application No. PCT/JP2011/070902, filed on Sep. 13, 2011.

(30) Foreign Application Priority Data

Sep. 24, 2010 (JP) .................................. 2010-213834

(51) Int. Cl.
*C03B 1/02* (2006.01)
*C03C 1/02* (2006.01)
*C03C 3/091* (2006.01)

(52) U.S. Cl.
CPC ... *C03B 1/02* (2013.01); *C03C 1/02* (2013.01); *C03C 3/091* (2013.01)
USPC ............................. 65/134.1; 501/27; 501/29

(58) Field of Classification Search
CPC ............. C03B 1/00; C03B 1/02; C03C 1/02; C03C 1/024; C03C 1/026
See application file for complete search history.

(56) References Cited

U.S. PATENT DOCUMENTS

| | | | | |
|---|---|---|---|---|
| 3,762,936 A | * | 10/1973 | Iler | .................................. 501/54 |
| 3,956,446 A | * | 5/1976 | Eirich et al. | ................... 264/117 |
| 4,074,989 A | * | 2/1978 | Brzozowski et al. | ............. 65/27 |
| 4,074,990 A | * | 2/1978 | Brzozowski et al. | ............. 65/27 |
| 4,074,991 A | * | 2/1978 | Brzozowski et al. | ............. 65/27 |
| 4,075,025 A | * | 2/1978 | Rostoker | .......................... 501/66 |
| 4,119,422 A | * | 10/1978 | Rostoker | .......................... 65/22 |
| 4,332,604 A | * | 6/1982 | Propster | ........................... 65/27 |
| 4,358,304 A | * | 11/1982 | Froberg | ........................... 65/27 |
| 7,937,969 B2 | * | 5/2011 | Carty | .......................... 65/136.1 |
| 2008/0087044 A1 | * | 4/2008 | Carty | .......................... 65/29.12 |
| 2012/0144863 A1 | * | 6/2012 | Shinohara et al. | ............. 65/21.2 |

FOREIGN PATENT DOCUMENTS

| | | |
|---|---|---|
| GB | 1 433 907 | 4/1976 |
| JP | 47-023404 | 10/1972 |
| JP | 2-120255 A | 5/1990 |
| JP | 7-277768 | 10/1995 |
| JP | 2007-297239 | 11/2007 |
| JP | 2009-179508 | 8/2009 |
| WO | WO 01/56942 A1 | 8/2001 |
| WO | 2011-024913 | 3/2011 |
| WO | WO 2011/092296 A1 | 8/2011 |

OTHER PUBLICATIONS

International Search Report issued Dec. 13, 2011 in PCT/JP2011/070902 filed Sep. 13, 2011.
Toru Iseda, "Research Result of NEDO Leading Research on Innovative Energy Saving Glass Melting Technique by In-Flight Melting Method" New Glass vol. 23, No. 4, 2008, p. 42-45.
Extended European Search Report issued Jan. 23, 2014 in European Application No. 11 82 6773.1.

* cited by examiner

*Primary Examiner* — Jason L Lazorcik
(74) *Attorney, Agent, or Firm* — Oblon, Spivak, McClelland, Maier & Neustadt, L.L.P.

(57) ABSTRACT

To provide a process for producing glass raw material granules which are less likely to be formed into fine powders which cause a change of the glass composition at a time of forming a glass melt or defects of glass, and which can be preferably used for producing glass.
A process for producing glass raw material granules, which comprises a granulation step of adding boric acid to either one of or both of a glass raw material powder and an alkaline solution having a pH of at least 9 and mixing the glass raw material powder together with the alkaline solution. The glass raw material powder preferably contains at least 10 mass % of boric acid.

11 Claims, No Drawings

PROCESS FOR PRODUCING GLASS MATERIAL GRANULES AND PROCESS FOR PRODUCING GLASS PRODUCT

TECHNICAL FIELD

The present invention relates to a process for producing glass material granules and a process for producing a glass product, particularly to a process for producing glass material granules having excellent strength, which are suitable for use in the production of glass by an in-flight melting method, and a process for producing a glass product.

BACKGROUND ART

A glass product is usually produced by melting glass raw materials by means of a glass melting furnace to form a glass melt and then forming the glass melt into a prescribed shape, followed by solidification. However, in order to obtain a homogeneous glass melt by means of a glass melting furnace, it was required to maintain the melting state over a very long period of time, whereby a large energy consumption was unavoidable.

In order to solve such a problem, a process for producing a glass product employing a technique so-called an in-flight melting method, has been proposed in which particles (granules) made of a mixture of glass raw materials are heated and melted in a gas phase atmosphere to form molten glass particles, and then, the molten glass particles are collected to form a liquid phase (glass melt) (e.g. Patent Document 1 and Non-Patent Document 1).

In a case where a glass product is produced by means of an in-flight melting method, usually, by a method of pneumatically conveying granules made of a mixture of glass raw materials, granules are supplied to an in-flight heating apparatus to melt the granules.

Further, it is known that granules to be used in the in-flight melting method can be produced by means of e.g. a spray drying granulation method (a spray drying method) (e.g. Patent Document 1).

Further, as a method for forming a mixed granulation glass raw material to be used for producing a glass product, a granulation method such as an agitation granulation method, a fluidized-bed granulation method, a tumbling granulation method, an extrusion granulation method or a dry granulation method is known (e.g. Patent Document 2).

Further, in a case where alkali-free glass is produced by a conventional melting method, not an in-flight melting method, a method is known wherein boric acid is incorporated in a glass material (material batch), water or a polyhydric alcohol is added, and granulation is carried out to improve the strength of granules (e.g. Patent Document 3).

PRIOR ART DOCUMENTS

Patent Documents

Patent Document 1: JP-A-2007-297239
Patent Document 2: JP-A-2009-179508
Patent Document 3: JP-A-S47-23404

Non-Patent Document 1: Toru Iseda, "Research Result of NEDO Leading Research on "Innovative Energy Saving Glass Melting Technique by In-Flight Melting Method"" NEW GLASS Vol. 23, No. 4, 2008, P. 42-45

DISCLOSURE OF INVENTION

Technical Problem

However, the conventional technique has had a problem that at the time of producing a glass product by means of an in-flight melting method, when granules made of a mixture of glass raw materials are pneumatically conveyed by e.g. an air stream to a gas phase atmosphere in the in-flight heating apparatus, a part of the granules is disintegrated to form a large amount of a fine powder. Such a fine powder is likely to drift and scatter in the in-flight heating apparatus or in the in-flight conveying apparatus for pneumatically conveying the granules, whereby the fine powder is likely to stick inside of the in-flight heating apparatus or be discharged out of the in-flight heating apparatus. Therefore, if the granules containing a substantial amount of such a fine powder are supplied to the in-flight heating apparatus, the composition of a glass melt obtainable by the in-flight melting method is likely to be changed, and the composition of the glass melt tends to be non-uniform. Consequently, also the glass composition of a glass product obtainable by forming and solidifying such a glass melt tends to be non-uniform.

Further, in conventional techniques, in a case where granules made of a mixture of glass raw materials are heated to form a glass melt by means of a glass melting furnace without using an in-flight melting method, there is a drawback that a part of the granules collapses, and fine powders are formed. If fine powders are formed at a time of preparing a glass melt, the fine powders stick to the inside of the glass melting furnace for heating granules, and the fine powders peel and drop in the subsequent steps, which may cause defects of glass. On the other hand, in conventional techniques, although a certain effect can be obtained by the presence of boric acid, the strength may be insufficient to employ such granules in the in-flight melting method, since the in-flight melting method is not assumed wherein a strong external pressure is applied to granules at a time of conveying the granules. Anyway, from the viewpoint of the above mentioned fine powders, granules having a high granule strength are desired so as to be used regardless of the difference of the melting method to be employed.

It is an object of the present invention to solve the above problem and to provide a process for producing glass raw material granules which have excellent strength and are less likely to form fine powders which may change a glass composition or cause defects in glass when forming a glass melt and which are suitable for use in the production of glass.

Further, it is an object of the present invention to provide a process for producing a glass product, whereby fine powders are not likely to be formed when forming a glass melt.

Solution to Problem

The present inventors have conducted an extensive study to solve the above problem. As a result, they have adopted the following constructions in order to improve the strength of glass raw material granules to be obtained.

The process for producing glass raw material granules of the present invention comprises a granulation step of adding boric acid to either one of or both of a glass raw material powder and an alkaline solution having a pH of at least 9 and mixing the glass raw material powder together with the alkaline solution.

Further, the process for producing glass raw material granules of the present invention comprises a granulation step of mixing a glass raw material powder containing boric acid together with an alkaline solution having a pH of at least 9.

Further, in order to solve the above problem, the process for producing a glass product of the present invention comprises a step of heating the glass raw material granules produced by the above process, to form a glass melt, and a step of forming and solidifying the glass melt.

Advantageous Effects of Invention

The glass raw material granules obtained by the process of the present invention have a sufficient strength as the glass raw material granules, are not likely to be formed into fine powders when formed into a glass melt and have a sufficient strength when used for producing glass. Accordingly, the glass raw material granules obtained by the process of the present invention are less likely to be formed into fine powders even when pneumatically conveyed and can be preferably used for producing glass by an in-flight melting method or for producing glass by using a glass melting furnace.

Such effects are considered to be obtainable by the following function of boric acid as a binder. However, if boric acid is simply added in a glass raw material powder in the granulation step, the function of boric acid cannot be sufficiently obtained. That is, in the process for producing glass raw material granules of the present invention, boric acid is added to either one of or both of the glass raw material powder and the alkaline solution having a pH of at least 9, and the glass raw material powder is mixed together with the alkaline solution, whereby boric acid contained in the glass raw material powder and/or the alkaline solution is dissolved in the alkaline solution during the granulation. Further, in the process for producing glass raw material granules of the present invention, the glass raw material powder containing boric acid is mixed together with the alkaline solution having a pH of at least 9, whereby boric acid contained in the glass raw material powder is dissolved in the alkaline solution during the granulation. It is considered that boric acid thus dissolved in the alkaline solution functions as a binder, whereby the strength of the glass raw material granules is improved.

Further, the process for producing a glass product of the present invention is a process comprising a step of heating the glass raw material granules produced by the process for producing granules of the present invention, to form a glass melt, and a step of forming and solidifying the glass melt, wherein as the glass raw material granules, ones having sufficient strength are used, whereby a fine powder is less likely to be formed which tends to cause a change of the glass composition or defects of glass at the time of forming a glass melt.

DESCRIPTION OF EMBODIMENTS

Now, the process for producing glass raw material granules of the present invention and the process for producing a glass product will be described in detail.
<Glass and Glass Raw Material Powder>

The glass raw material granules (hereinafter sometimes referred to simply as the granules) to be produced by means of the process of the present invention are glass raw material granules for the production of a borosilicate glass, which are useful for the purpose of producing a glass product made of a glass having a composition containing a boron component (borosilicate glass).

In the present invention, glass means oxide-type glass, and the respective components in the oxide type glass are represented by oxides, and mass proportions of the respective components are represented as calculated as oxides. The borosilicate glass is an oxide type glass containing silicon oxide as the main component and containing a boron component. The boron component in the borosilicate glass is boron oxide (a general term for boron oxides such as diboron trioxide ($B_2O_3$), etc.), and is hereinafter represented by $B_2O_3$, and the mass proportion of boron oxide in the glass is represented as calculated as $B_2O_3$. The main components in the glass are likewise represented by oxides such as $SiO_2$, $Al_2O_3$, MgO, CaO, SrO, BaO, $Na_2O$, etc., and their mass proportions are represented as calculated as oxides. In the present invention, the borosilicate glass is an oxide type glass containing silicon oxide as the main component and containing boron oxide in an amount of at least 1 mass % as calculated as the above oxide.

The glass raw material powder to be used for the production of the glass raw material granules is one comprising the above-mentioned oxides or compounds capable of forming such oxides by e.g. thermal decomposition. The compounds capable of forming such oxides may, for example, be hydroxides, carbonates, nitrates, halides, etc. The raw material capable of forming boron oxide in glass may, for example, be boric acid, boron oxide, colemanite [$CaB_3O_4(OH)_3 \cdot H_2O$], etc.

The glass raw material powder is preferably one adjusted so that it becomes a borosilicate glass wherein the content of boron oxide is from 1 to 30 mass % as represented by mass percentage based on the oxide, more preferably one adjusted so that it becomes a borosilicate glass wherein the content of boron oxide is from 2 to 20 mass %. In this embodiment, as the glass raw material powder, one containing boric acid is used, and a borosilicate glass is produced wherein the content of boron oxide is within the above range.

Boric acid is a general term for oxy acids of boron, such as orthoboric acid ($H_3BO_3$) etc., but in the present invention, boric acid is meant for orthoboric acid ($H_3BO_3$). Boric acid is soluble in an alkaline solution having a pH of at least 8.

Further, in a case where boron oxide is contained in a glass raw material powder, boron oxide is also one which is soluble in an alkaline solution having a pH of at least 8. In a case where boron oxide contained in a glass raw material powder is dissolved in an alkaline solution during granulation and changed to boric acid, such boric acid derived from boron oxide is also one which functions as a binder. Thus, the glass raw material powder preferably contains boron oxide.

Further, even if a boron compound such as colemanite which is not soluble in an alkaline solution having a pH of at least 8 is contained in the glass raw material powder, such a boron compound will not function as a binder, and therefore such a boron compound is not included in the amount of boric acid contained in the glass raw material powder. The boron compound such as colemanite which is not soluble in an alkaline solution having a pH of at least 8 becomes a boron oxide source for borosilicate glass. Accordingly, when borosilicate having a high content of boron oxide is to be produced, colemanite is preferably contained in a glass raw material powder.

The amount of boric acid contained in the glass raw material powder is preferably at least 10 mass %, more preferably from 13 to 30 mass %. When the amount of boric acid contained in the glass raw material powder is at least 10 mass %, the amount of boric acid to be dissolved in an alkaline solution is sufficient, whereby the effect to improve the strength of glass raw material granules can be sufficiently obtained, and the formation of fine particles can be sufficiently suppressed when the granules are pneumatically conveyed to a gas phase atmosphere. If the amount of boric acid contained in the glass raw material powder is less than 10 mass %, the amount of boric acid to be dissolved in an alkaline solution to function as a binder during granulation is low, whereby the effect to improve the strength of glass raw material granules may not be sufficiently obtained. When the amount of boric acid contained in the glass raw material powder is at most 30 mass %, it is less likely that the degree of freedom of the glass composition produced by using granules is restricted due to an excess content of boric acid, such being preferred.

In the present invention, the amount of boric acid of at least 10 mass % and at most 30 mass % means that boric acid is contained in an amount of at least 10 mass % and at most 30 mass %, based on the amount of the glass raw material powder, based on the alkaline solution containing boric acid or based on the total amount of the glass raw material powder and the alkaline solution containing boric acid.

The amount of the boron component (the amount as calculated as the oxide) in the glass raw material powder to be used for the production of a borosilicate glass is usually required to be larger than the content of boron oxide in the desired borosilicate glass. This is because boron oxide is readily volatilized from a glass melt. Accordingly, in order to produce a borosilicate glass having a desired boron oxide content, the amount of the boron component in the glass raw material powder is adjusted by taking into consideration the volatile amount of boron oxide. Here, a usual metal oxide such as silicon oxide is less likely to volatile from the glass melt, and the amount of such a component in the glass raw material powder (the amount as calculated as the oxide) and the amount of the component in the obtainable borosilicate glass (the amount as calculated as the oxide) are substantially equal.

In the present invention, the desired borosilicate glass is preferably a borosilicate glass containing little alkali component (an oxide of an alkali metal such as sodium or potassium) or containing substantially no alkali component. That is, it is preferably an alkali-free borosilicate glass. As such a borosilicate glass, a borosilicate glass having the following composition (1) as represented by mass percentage based on oxides, is preferred. Here, the following R represents an alkali metal. Further, metal oxides other than the following, non-metal oxides (such as sulfur oxide, etc.), halogens, etc. may further be contained in small amounts.

$SiO_2$: from 40 to 85 mass %, $Al_2O_3$: from 1 to 22 mass %, $B_2O_3$: from 2 to 20 mass %, MgO: from 0 to 8 mass %, CaO: from 0 to 14.5 mass %, SrO: from 0 to 24 mass %, BaO: from 0 to 30 mass %, and $R_2O$: from 0 to 10 mass % (1)

The expression "to" representing the above numerical ranges is used to include the numerical values presented before and after the expression as the lower limit value and the upper limit value, and hereinafter in the present specification, the expression "to" is used to have the same meaning.

A more preferred borosilicate glass is alkali-free glass of the above composition (1) wherein the content of the alkali component ($R_2O$) is at most 0.1 mass %.

The glass raw material powder to be used for the production of the glass raw material granules is preferably one adjusted so that it becomes a borosilicate glass having the above composition (1). As such a composition of glass raw material powder (hereinafter referred to also as a glass matrix composition), a raw material mixture of metal oxide sources is employed which has substantially the desired composition of a borosilicate glass as calculated as the oxides, except for a boron oxide source. The boron oxide source is adjusted so that its amount is larger by an amount corresponding to the volatile amount than the boron oxide content in the desired borosilicate glass. For example, as the glass raw material powder to produce alkali-free borosilicate glass, the following metal oxide sources and the raw material mixture having the following composition (glass matrix composition) may be mentioned.

$SiO_2$: from 40 to 60 mass %, $Al_2O_3$: from 5 to 20 mass %, $H_3BO_3$: from 5 to 30 mass %, $CaB_3O_4(OH)_3 \cdot H_2O$ (colemanite): from 0 to 15 mass %, $Mg(OH)_2$: from 0 to 5 mass %, $CaCO_3$: from 0 to 10 mass %, $SrCO_3$: from 0 to 15 mass %, $SrCl_2 \cdot 6H_2O$: from 0 to 5 mass %, and $BaCO_3$: from 0 to 30 mass %.

If the average particle size of the glass raw material powder is too large relative to the average particle size of the glass raw material granules, respective compositions of glass raw material granules to be obtained might be heterogenous one another. Further, if the particles of the glass raw material powder are too large, it is necessary to spend a long time and consume a large energy for vitrifying the granules, and it might be difficult to form molten glass particles in a gas atmosphere. Therefore, it is preferred to preliminarily form the glass raw material powder into fine particles. For example, it is preferred to form the glass raw material powder into fine particles by using a ball mill or the like at a time of preparing a glass raw material powder or after or during mixing components of the glass raw material powder. The average particle size of the glass raw material powder is preferably at most 30 μm, more preferably at most 20 μm, particularly preferably at most 10 μm.

The average particle size of the glass raw material powder is preferably from 1/30 to 1/3, more preferably from 1/20 to 1/5, particularly preferably from 1/15 to 1/8, of the average particle size of the glass raw material granules. Even in a case where such a glass raw material powder is used, it is preferred to carry out a step of forming the glass raw material powder into fine particles prior to preparing the glass raw material powder.

<Glass Raw Material Granules>

The glass raw material granules of the present invention are preferably used as a raw material for producing a glass product by means of an in-flight melting method. In the in-flight melting method, glass raw material granules are melted in a gas phase atmosphere to form molten glass particles, the molten glass particles formed in the gas phase atmosphere are collected to form a glass melt, and the glass melt is formed and solidified.

The glass composition of the molten glass particles is substantially equal to the glass composition of the glass melt, and the glass composition of the glass melt is substantially equal to the glass composition of the desired glass product obtained by forming and solidifying the glass melt. The glass composition of the molten glass particles or the glass melt being substantially equal to the glass composition of the glass product means that a volatile component such as boron oxide is volatilized from the glass in a molten state (such as molten glass particles or a glass melt), whereby the glass composition of the glass in a molten state and the glass composition of a glass product obtainable from such a glass melt will not be completely the same.

Individual molten glass particles formed by melting of individual glass raw material granules in a gas phase atmosphere, preferably have a substantially equal glass composition. When individual molten glass particles have a substantially equal glass composition, the necessity to homogenize the glass composition of the glass melt obtained by collecting them will decrease. If individual molten glass particles are different in their glass composition, the glass composition of the glass melt obtained by collecting them initially becomes non-uniform, whereby the time and energy will be required to homogenize such a glass melt. In order to let individual molten glass particles have a substantially equal glass composition, it is preferred to let the glass matrix composition of individual glass raw material granules have a mutually uniform composition.

The average particle size of the glass raw material granules is made to be preferably within a range of from 50 to 1,000 μm, more preferably within a range of from 50 to 800 μm. When the average particle size of the glass raw material granules is at least 50 μm, not only it is possible to reduce e.g. scattering to the flue during in-flight melting, but also it is possible to reduce volatilization of boric acid from the surface which is likely to occur during the melting, since the surface area per unit weight becomes small, such being desirable. Further, when the average particle size of the glass raw material granules is at most 1,000 μm, vitrification sufficiently proceeds to the interior of the granules, such being desirable. The average particle size of the glass raw material granules can be adjusted depending upon the conditions such as the composition of the glass raw material powder, the type, amount and pH of the alkaline solution, the method or time for mixing the glass raw material powder and the alkaline solution, etc.

Here, in the present invention, the average particle size of particles such as the glass raw material granules or the glass raw material powder, is an average particle size obtainable by the following measuring method.

That is, in the case of the average particle size of the glass raw material powder, a 50% diameter in the particle size distribution curve measured by means of a laser diffraction scattering method by a wet system (referred to also as D50 or a median diameter, i.e. when a powder is divided into two from a certain particle diameter, a diameter where the larger side and the smaller side become an equal amount) is taken. Further, in the case of the average particle size of the glass raw material granules, a 50% diameter in the particle size distribution curve measured by means of a laser diffraction scattering method by a dry system, is taken.

Further, the glass raw material granules are preferably ones wherein the non-uniformity in the particle sizes is small so that a glass product having a uniform glass composition can be obtained. When the glass raw material powder is sufficiently granulated, the non-uniformity in the particle sizes of the glass material granules tends to be small. The larger the amount of a glass raw material powder which is insufficiently granulated and remained in the glass raw material granules is, the larger the non-uniformity in the particle sizes is.

<Process for Producing Glass Raw Material Granules>

The process for producing glass raw material granules of this embodiment comprises a granulation step of adding boric acid to either one of or both of a glass raw material powder and an alkaline solution having a pH of at least 9 and mixing the glass raw material powder together with the alkaline solution.

As another mode, the process for producing the glass raw material granules of this embodiment comprises a granulation step of mixing a glass raw material powder containing boric acid together with an alkaline solution having a pH of at least 9.

The alkaline solution of the present invention prior to adding boric acid is not particularly restricted, so long as it is an alkaline solution having a pH of at least 9. For example, it may be one containing a pH adjustor and a liquid medium. As the liquid medium, water is preferably used. In the following, description will be made mainly with respect to a case where water is used as a liquid medium, however, the liquid medium is by no means restricted to water. Further, as a liquid medium other than water, a liquid medium having a solubility of boric acid higher than water may be preferably used.

The pH of the alkaline solution is controlled to at least 9 by a pH adjustor and is preferably from 10 to 13.5. Further, the pH of a solvent having a low electric conductivity such a non-aqueous solvent can be measured for example by using pH electrode 6377-10D for low conductivity water and no aqueous solvents, manufactured by HORIBA, Ltd.

The solubility of boric acid depends on the pH of the alkaline solution. When the alkaline solution has a pH of at least 9, a sufficiently high solubility of boric acid can be obtained. If the alkaline solution has a pH of less than 9, the solubility of boric acid becomes insufficient, so that boric acid contained in a glass raw material powder cannot be sufficiently dissolved during granulation, and the function of boric acid as a binder becomes insufficient. Further, when the pH of the alkaline solution is increased to at least 10, the solubility of boric acid becomes higher, and boric acid contained in the glass raw material powder can be dissolved more during granulation, such being preferred. Further, even in a case where boron oxide is used as a source of boric acid, when the alkaline solution has a pH of at least 9, it is considered that boron oxide quickly reacts with water and becomes boric acid which will be dissolved in the alkaline solution.

Further, up to here, description has been made with respect to a case where boric acid is contained in a glass raw material powder. However, from the viewpoint of the effect of the present invention, a part of or all of boron may be added in the alkaline solution so as to be the above mentioned glass composition. When boric acid is to be contained in the alkaline solution, boric acid may be in a powder state similar to boric acid in a glass raw material powder, such being preferred from the viewpoint of dissolving in the alkaline solution. In the present invention, an alkaline solution having a pH of at least 9 is used, not water or a polyhydric alcohol used in Patent Document 3, whereby a relatively large amount of boric acid can be dissolved. However, in a case where the amount of boron contained in a predetermined composition of a glass product to be produced is large, and such an amount of boric acid is added in the alkaline solution, the amount of boric acid may sometimes exceed the solubility in the alkaline solution. In such a case, the amount of boric acid exceeding the solubility may be added in the glass raw material powder. Further, in a case where the amount of boric acid in the alkaline solution is large, the pH of the alkaline solution may be increased accordingly.

Further, as a result of the study by the present inventors, it has been found that if once boric acid is dissolved in the alkaline solution, boric acid will not precipitate even if concentrated, but forms a liquid having a viscosity like starch syrup. Accordingly, even if the most of boric acid in the glass raw material component is added in the alkaline solution, if once boric acid is dissolved in the alkaline solution, it will function as a binder.

The pH of the alkaline solution prior to adding boric acid is preferably at most 13.5, more preferably at most 12. It is preferred to adjust the pH to at most 13.5, whereby it is possible to avoid a disadvantage due to too high pH of the alkaline solution such that the types of the useful pH adjustor decrease, the handling efficiency of the alkaline solution decreases, or the durability of an equipment to be used in the granulation step deteriorates.

The pH adjustor contained in the alkaline solution is not particularly limited, so long as it is one capable of adjusting the pH of the alkaline solution to be at least 9, but it is preferably determined depending upon e.g. the type of glass obtainable by using the granules. Further, the amount of the pH adjustor contained in the alkaline solution is suitably determined depending upon the amount of boric acid contained in the glass raw material powder, the type of the liquid medium, the type of the pH adjustor, etc.

In the case of producing a borosilicate glass containing an alkali metal oxide, it is possible to use a basic alkali metal compound as a pH adjustor. Such a basic alkali metal compound is preferably one capable of being used as a glass raw material. Such a basic alkali metal compound may be regarded as a part or whole of the alkali metal source in the glass raw material granules. The basic alkali metal compound which can be used as a glass raw material, may, for example, be an alkali metal hydroxide such as sodium hydroxide, or an alkali metal carbonate such as sodium carbonate.

In the case of producing an alkali-free borosilicate glass, it is difficult to use an alkali metal compound as the pH adjustor. In the case of producing an alkali-free borosilicate glass, it is preferred to use a basic nitrogen compound containing no metal atom, as the pH adjustor. In a case where a highly volatile compound is used as the basic nitrogen compound, such a basic nitrogen compound will not remain in the glass raw material granules. Further, in a case where a low volatile compound is used as the basic nitrogen compound, and the basic nitrogen compound remains in the glass raw material granules, such a remaining basic nitrogen compound will be decomposed and disappear at the time of melting the granules. As the basic nitrogen compound to be used as the pH adjustor, ammonia or a water-soluble amine compound is preferred. As the water-soluble amine compound, a water soluble alkanoyl amine or N-alkylalkanolamine is, for example, preferred, and specifically, monoethanolamine, diethanolamine or triethanolamine may, for example, be mentioned.

As a case requires, in addition to the pH adjustor and the liquid medium, an additive such as polyvinyl alcohol (PVA) and an acrylic polymer may be appropriately added in the alkaline solution. However, since PVA may react to boric acid dissolved in water and precipitate, the acrylic polymer is preferred. The total amount of the additive in the alkaline solution is preferably at most 3 mass %, more preferably at most 2% per the alkaline solution. Further, the additive is preferably one which volatizes and decomposes before melting glass raw material granules and thereby has no influence on the glass composition. The alkaline solution may, for example, be prepared by mixing a pH adjustor and a liquid medium by an optional method. In a case where PVA is used as a binder, as the degree of the polymerization is small, gelation due to the reaction with boric acid tends not to occur. Accordingly, PVA having a relatively small degree of the polymerization at a level of at most 500 is preferably used. Further, in a case where an acrylic polymer is used as a binder, a conventional binder for ceramics may be used in most cases without any problem. In such a case, the viscosity is preferably low in order to improve the dispersibility of the powder in water. At a level of the above amount to be added, the viscosity is considered to be almost the same as a solvent (water).

By carrying out the granulation step of this embodiment, a glass raw material powder and an alkaline solution are mixed, and the outer surface of the glass raw material powder is in contact with the alkaline solution. Since boric acid is contained in the glass raw material powder, boric acid contained in the glass raw material powder is dissolved in the alkaline solution at the outer surface of the glass raw material powder. Accordingly, in the granulation step, the glass material powder is attached and agglomerated in a state included in dissolved boric acid.

Boric acid dissolved in the alkaline solution will not re-precipitate even after dried and forms a viscous solution. Thus, such dissolved boric acid functions as a binder for binding attached and agglomerated glass raw material powders one another to form glass raw material granules. As a result, in the case of the glass raw material granules obtained by this embodiment, the glass raw material powders are bonded one another by a strong force and have an excellent strength.

The granulation step in this embodiment is not particularly restricted, so long as the glass raw material powder and the alkaline solution can be mixed. However, before mixing the glass raw material powder and the alkaline solution, a step of stirring only the glass raw material powder may be included. In such a case, the non-uniformity in the composition of the glass raw material powder becomes less, and glass raw material granules of which non-uniformity in the composition is less can be obtained. Further, the step of stirring only the glass raw material powder may also serve as a step of preparing a glass raw material powder.

Further, in the granulation step, it is preferred to spray the alkaline solution to the glass raw material powder in order to uniformly supply the alkaline solution to the glass raw material powder. The alkaline solution may be sprayed to the glass raw material powder being stirred or may be sprayed to a stationary state glass raw material powder.

In a case where the alkaline solution is sprayed to the glass raw material powder being stirred and mixed, the alkaline solution can be more easily and uniformly supplied to the glass raw material powder, and boric acid dissolved in the alkaline solution and having a function as a binder can be substantially uniformly removed from the glass raw material powder during the mixing. As a result, glass raw material granules of which non-uniformity in the particle size and the composition is remarkably less can be obtained.

Further, in a case where the alkaline solution is sprayed to a stationary state glass raw material powder, after spraying the alkaline solution, the glass raw material powder and the alkaline solution may be mixed.

Further, in the granulation step, the method of mixing a glass raw material powder together with an alkaline solution is not particularly restricted, so long as the glass raw material powder and the alkaline solution can be mixed. However, a tumbling granulation method is preferably employed.

By employing the tumbling granulation method, the glass raw material powder and the alkaline solution can be efficiently and uniformly mixed, and boric acid dissolved in the alkaline solution and having a function as a binder can be substantially uniformly removed from the glass raw material powder, such being preferred.

Further, as the function of boric acid as a binder, irrespective of whether boric acid is one contained in the glass raw material powder or boric acid is one dissolved in the alkaline solution, the function to bind granule components is the same. In a case where a large amount of boric acid is added in an alkaline solution, the alkaline solution itself becomes a viscous liquid because of boric acid and will not precipitate even though concentrated, whereby an effect can be obtained.

The tumbling granulation method may, for example, be a granulation method wherein a predetermined amount of a glass raw material powder and a predetermined amount of an alkaline solution are added in a container of a tumbling granulation apparatus, and the inside of the container is shaken and/or rotated, or a granulation method wherein a predetermined amount of a glass raw material powder is added in a container of a tumbling granulation apparatus, and while mixing-rotating-stirring the glass raw material powder by shaking and/or rotating the inside of the container, a predetermined amount of an alkaline solution is sprayed to the glass raw material powder. As the container of the tumbling granulation apparatus, a rotary container having a dish shape, a column shape or a corn shape or a vibration container may be used, and such a container is not particularly restricted.

Further, as the tumbling granulation apparatus used in the tumbling granulation method is not particularly restricted. For example, an apparatus provided with a container which is rotated and has the rotational axis of a tilted direction toward the vertical line and rotors which have the rotational axis as the center in the container and rotate toward the opposite direction to the container, may be used. As such a tumbling granulation apparatus, an EIRICH intensive mixer (manufactured by EIRICH) may be specifically mentioned.

Further, in the granulation step, conditions for mixing a glass raw material powder together with an alkaline solution, such as time, may be appropriately decided, depending on the type and the amount of the glass raw material powder, the pH and the amount of the alkaline solution, an apparatus to be used, etc.

In this embodiment, after the granulation step, it is preferred to carry out a drying step of drying glass raw material granules obtained. The drying step is not particularly restricted so long as the glass raw material granules can be dried. For example, a method for heating at a temperature of from 100 to 120° C. for from 6 to 12 hours may be employed.

Further, the amount of water contained in the glass raw material granules after the drying step is preferably at most 10%, more preferably at most 5%, further preferably at most 1%. The amount of water can be measured by a method prescribed in JIS R 1639-3, or a simple and quick measuring method using a kett moisture tester, for example infrared moisture balance FD-610 (manufactured by Kett Electric Laboratory) may be employed. When the water content contained in the glass raw material granules is at most 10%, the expansion force of water contained in the glass raw material granules at a time of melting the glass raw material granules is small, whereby the granules can be prevented from collapsing, and the amount of fine particles formed by the collapse of the granules at a time of melting the glass raw material granules can be further reduced.

The glass raw material granules obtained after the granulation step or the drying step may be sieved, as a case requires.

<Process for Producing Glass Product>

The process for producing a glass product in this embodiment is a process for producing glass by means of an in-flight melting method, and comprises heating and melting in a gas phase atmosphere the glass raw material granules produced by the above-described production process to form molten glass particles, collecting the molten glass particles, forming them to a glass melt and forming and solidifying the glass melt to obtain a glass product.

At the time of producing glass by means of the in-flight melting method, as a method for introducing the glass raw material granules into the gas phase atmosphere of an in-flight heating apparatus, it is preferred to employ a pneumatic conveying method to convey the granules by a stream of e.g. air, since such a method is convenient and easy to use. However, the conveying method is not limited thereto, and other conveying methods may be employed.

The glass raw material granules obtained by using the process of the present invention are ones having a high strength and thus are preferred as being less susceptible to breakage not only when conveyed by in-flight conveying but also when conveyed by other methods. Whereas, glass raw material granules produced by a conventional production process have a low strength, whereby not only when conveyed by in-flight conveying but also when conveyed by other methods, in many cases, the particles are likely to be broken by collision of the particles among themselves during the transportation of the particles or by collision to an inner wall of the transportation path.

The method of melting the glass raw material granules in a gas phase atmosphere to form molten glass particles (namely molten granules) is not particularly limited, and it may, for example, be a method of using an in-flight heating apparatus wherein the glass raw material granules are heated by means of a thermal plasma arc or an oxygen combustion flame. Further, in order to collect the molten glass particles to form a glass melt, a method is usually employed wherein the molten glass particles falling by their own weight in the gas phase atmosphere are received and collected in a heat resistant container provided at a lower portion of the gas phase atmosphere to form a glass melt. Further, as a method of forming and solidifying a glass melt, it is possible to employ, for example, a method for producing a plate glass product such as a float process or a down draw method, a method for producing a fiber glass product such as a melt spinning method, or a method for producing glass products of various shapes, such as a molding method.

Compared to glass products produced by using glass raw material granules prepared in the same manner except that ion exchanged water is used instead of an alkaline solution, a glass product produced by using the glass raw material granules prepared by the production method of the present invention has a uniform glass composition.

Further, in a case where the granulation step of the present invention of mixing a glass raw material powder containing boric acid together with an alkaline solution having a pH of at least 9, is carried out, the content of boric acid contained in the glass raw material granules can be easily and highly accurately controlled, whereby glass raw material granules having a stable composition can be obtained, such being preferred.

Further, as described above, the process for producing a glass product of the present invention is preferably employed in methods for producing glass products employing an in-flight melting method. On the other hand, the process for producing a glass product of the present invention is not particularly restricted to methods employing an in-flight melting method, so long as the process comprises a step of heating glass raw material granules prepared by the process for producing glass raw material granules of the present invention to form a glass melt and a step of forming and solidifying the glass melt. Accordingly, the process for producing a glass product of the present invention is preferably employed in a case where glass raw material granules prepared by the production process of the present invention are heated by using a glass melting furnace to form a glass melt.

EXAMPLES

The desired values of the glass composition after preparing a glass product are represented by mass proportions calculated as oxides and A, B, C compositions shown in Table 1. The glass raw material powders to be the desired values are the preparation of a, b, c, d, and e shown in Table 2. Here, among the preparation compositions a, b, c, d and e of the glass powder shown in Table 2, a, b and d represent the preparation composition for obtaining glass B of the glass composition shown in Table 1, c represents the preparation composition for obtaining glass A of the glass composition shown in Table 1, and e represents the preparation composition for obtaining glass C of the glass composition shown in Table 1. Each raw material powder was put in a container of a mixer and mixed for preparation. Further, the particle size (D50) of each raw material powder is shown in Table 2. In Table, $H_3BO_3$ (boric acid) and $SrCl_2.6H_2O$ are water soluble powders.

TABLE 1

|  | A | B | C |
|---|---|---|---|
| $SiO_2$ | 50 | 60 | 83 |
| $Al_2O_3$ | 10 | 17 | 1 |
| $B_2O_3$ | 15 | 8 | 12 |
| BaO | 25 | — | — |
| MgO | — | 3 | — |
| CaO | — | 4 | — |
| SrO | — | 8 | — |
| $Na_2O$ | — | — | 4 |

TABLE 2

|  | Particle size D50 (μm) | a | b | c | d | e |
|---|---|---|---|---|---|---|
| SiO2 (Silica sand) | 10 | 51 | 51 | 40 | 52 | 74 |
| Al2O3 (Alumina) | 6 | 15 | 15 | 8 | 15 | 1 |
| H3BO3 (Boric acid) | 44 | 13 | 6 | 26 | 10 | 19 |
| Mg(OH)2 | 7 | 4 | 4 | — | 4 | — |
| CaB3O4(OH)3·H2O (Colemanite) | 17 | — | 13 | — | 4 | — |
| CaCO3 | 11 | 6 | — | — | 4 | — |
| BaCO3 | 7 | — | — | 26 | — | — |
| SrCO3 | 5 | 9 | 9 | — | 9 | — |
| SrCl2·6H2O | 400 | 2 | 2 | — | 2 | — |
| Na2CO3 | 133 | — | — | — | — | 6 |

Next, the glass raw material powders a, b, c and d were respectively added in a dish shape rotational container of which the bottom surface slants to the horizontal plane in a tumbling granulation apparatus. While mix-tumbling-stirring the glass raw material powders a, b, c and d by rotating the rotational container, a spray solution having a predetermined pH and containing ion exchange water which is a liquid medium and a pH adjustor was sprayed to the glass raw material powders a, b, c and d being mixed to carry out a granulation step of mixing the glass raw material powder together with the spray solution, whereby the glass raw material granules of Examples 1 to 5 and Comparative Examples 1 to 4 were obtained. Tables 3 and 4 show conditions and results. Here, at the step of the spray, 40 g of the spray solution was sprayed to 200 g of the glass raw material powder.

Further, 184 g of a raw material which is one removing 16 g of boric acid from 200 g of the glass raw material powder having the composition e was added in a container of a mixer and mixed for preparation. 200 g of an alkaline solution having a pH of 10.8 and containing ion exchange water and ammonium water was prepared, and 80 g of boric acid was added little by little to the alkaline solution, while stirring the alkaline solution. Since the pH shifted to an acidic side of at most 6 by adding boric acid, an ammonium water was added until the total amount 80 g of boric acid was dissolved. When the pH of the solution became 8.8, the total amount of boric acid was dissolved. Regarding this amount of boric acid, the alkaline solution preferably had a pH of at least 10.8. Next, 184 g of the above raw material was added in a dish shape rotational container of which the bottom surface slants to the horizontal plane in a tumbling granulation apparatus. While mix-tumbling-stirring by rotating the rotational container, 56 g of the above boric acid solution (containing approximately 40 g of water and 16 g of boric acid) was sprayed, and a granulation step of mixing the glass raw material powder together with the spray solution was carried out to prepare glass raw material granules of Example 6. Table 5 shows conditions and results.

Further, 174 g of a raw material which is one removing the total amount of boric acid (26 g) from 200 g of the glass raw material powder having the composition a was added in a container of a mixer and mixed for preparation. Next, 140 g of a boric acid solution (having a pH of at least 10.8 before dissolving boric acid) which is the above mentioned alkaline solution was added in an over at 110° C., moisture was evaporated until the weight became 100 g (approximately 60 g of moisture and 40 g of boric acid) and then cooled to prepare a boric acid solution. Then, 174 g of the above mentioned raw material was added in a dish shape rotational container of which the bottom surface slants to the horizontal plane in a tumbling granulation apparatus. While mix-tumbling-stirring by rotating the rotational container, 65 g of the boric acid solution (approximately 39 g of moisture, and 26 g of boric acid) was sprayed, and a granulation step of mixing the glass raw material powder together with the spray solution was carried out to prepare glass raw material granules of Example 7. Table 5 shows conditions and results.

TABLE 3

| Ex. | Glass raw material powder | Spray solution pH | pH adjustor | Glass composition | (D90/D10) value | Correlation coefficient |
|---|---|---|---|---|---|---|
| 1 | a | 9.6 | Triethanolamine | B | 3.5 | 0.997 |
| 2 | a | 13.5 | High alkali electrolytic water | B | 3.2 | 0.997 |
| 3 | c | 9.4 | Triethanolamine | A | 2.1 | 0.994 |
| 4 | d | 9.5 | Triethanolamine | B | 4.1 | 0.991 |
| 5 | c | 9 | Ammonia | A | 2.4 | 0.994 |

TABLE 4

| Comp. Ex. | Glass raw material powder | Spray solution pH | pH adjustor | Glass composition | (D90/D10) value | Correlation coefficient |
|---|---|---|---|---|---|---|
| 1 | a | 7.2 | — | B | 13.4 | 0.976 |
| 2 | a | 8.2 | Triethanolamine | B | 24.2 | 0.943 |

TABLE 4-continued

| Comp. Ex. | Glass raw material powder | Spray solution pH | pH adjustor | Glass composition | (D90/D10) value | Correlation coefficient |
|---|---|---|---|---|---|---|
| 3 | b | 9.5 | Triethanolamine | B | 42.8 | 0.948 |
| 4 | b | 13.5 | High alkali electrolytic water | B | 41.7 | 0.945 |

TABLE 5

| Ex. | Glass raw material powder | pH adjustor | Glass composition | (D90/D10) value | Correlation coefficient |
|---|---|---|---|---|---|
| 6 | e | Ammonia | C | 3.7 | 0.990 |
| 7 | a | Ammonia | B | 3.8 | 0.995 |

Further, as triethanolamine which was used as a pH adjustor shown in Tables 3 and 4, a triethanolamine reagent was used, as a high alkali electrolytic water, strong alkali water (manufactured by PGJ Co., Ltd.) was used, and as ammonia shown in Tables 3 and 5, a reagent chemical ammonia water was used.

Further, in Comparative Example 1 shown in Table 4, ion exchange water was used as a spray solution instead of a pH adjustor. Comparative Example 1 corresponds to granules prepared by the method of Patent Document 3.

Next, after the granulation step, a drying step of drying the glass raw material granules obtained in Examples 1 to 7 and Comparative Examples 1 to 4 at a temperature of 105° C. for 12 hours was carried out. The water content contained in the glass raw material granules prepared in Examples 1 to 7 and Comparative Examples 1 to 4 after the drying step was at most 1%.

The glass raw material granules of Examples 1 to 7 and Comparative Examples 1 to 4 obtained after the drying step were sieved into a range of from 25 to 300 μm and visually observed. The (D90/D10) value and the correlation coefficient were calculated and evaluated as described below. The results are shown in Tables 3, 4 and 5.

Here, when the correlation coefficient is high in the region of the particle size of from 25 to 300 μm after the sieve, the glass raw material granules has a sufficient strength.

[(D90/D10) Value]

The particle size of the glass raw material granules was measured by means of the dry laser diffraction scattering method, and (D10) which is 10% of the particle size from the small particle size side in the particle size distribution curve was measured. Further, the particle size of the glass raw material granules was measured by means of the dry laser diffraction scattering method, and (D90) which is 90% of the particle size from the small particle size side of the particle size diffraction curve was measured. Then, (D90) was divided by (D10) to calculate (D90/D10).

The non-uniformity in the particle size of the glass raw material granules was evaluated by the (D90/D10) value thus obtained. The smaller the (D90/D10) is, the smaller the distribution of the particle size of the glass raw material granules is, which is evaluated as that the glass raw material powder is sufficiently granulated.

[Correlation Coefficient]

The glass raw material granules were collided one another, and the change of the particle size distribution of the granules was measured to evaluate the degree of breakage (collapse) of the granules. Specifically, first, by means of the laser diffraction light scattering method and by using the particle size distribution meter (Microtrac MT3300, manufactured by NIKKISO Co., Ltd.) for measuring the particle size distribution, compressed air having a compressed air pressure of 0 psi (0 kPa) or 50 psi (345 kPa) was blown to the granules immediately before entering a measuring chamber of the particle size distribution meter, and the particle size distribution at the compressed air pressure of 0 psi (0 kPa) and the particle size distribution at the compressed air pressure of 50 psi (345 kPa) were measured. Then, by using the particle size distribution curve at the compressed air pressure of 0 psi (0 kPa) and the particle size distribution curve at the compressed air pressure of 50 psi (345 kPa), their correlation coefficient in the range of the particle size of from 0.972 to 322.8 μm was calculated.

The strength of the glass raw material granules was evaluated by the correlation coefficient thus obtained. The closer to 1 the correlation coefficient is, the higher the degree of the similarity of the particle size distribution at the compressed air pressure of 0 psi (0 kPa) and the particle size distribution at the compressed air pressure of 50 psi (345 kPa). The difference between the particle size distribution at the compressed air pressure 0 psi (0 kPa) and the particle size distribution at the compressed air pressure 50 psi (345 kPa) is considered to be caused by collapse of the glass raw material granules due to blown compressed air. Thus, as the correlation coefficient approaches to 1, fine particles due to the collapse of the granules are not likely to be formed even by blowing compressed air of 50 psi (345 kPa), and the glass raw material granules are evaluated as excellent in the strength.

Further, the particle size distribution curves for calculating the (D90/D10) value and the correlation coefficient were obtained by using 68 numerical values i.e. standard sieve aperture sections corresponding to the particle size of from 0.972 to 322.8 μm plus average aperture values corresponding to the upper and lower limit values of the respective aperture sections.

Here, the correlation coefficient of the obtained two particle distributions was calculated by applying CORREL function being a build-in function of EXCEL2002SP3 manufactured by Microsoft to the cumulative percent data on the obtained to particle size distributions.

It is evident from Tables 3 and 5 that the glass raw material granules of Examples 1 to 7 had a sufficiently small D90/D10 value of at most 5, and the degree of the distribution of the particle size was small. Thus, the granulation of the glass raw material was sufficiently carried out. Further, by visual observation, it was observed that the glass raw material granules of Examples 1 to 7 were sufficiently granulated. Further, it is evident from Tables 3 and 5 that the glass raw material granules of Examples 1 to 7 had a correction efficient of higher than 0.99 which is close to 1, and thereby had an excellent strength.

On the other hand, it is evident from Table 4 that the glass raw material granules of Comparative Example 1 prepared by using ion exchange water instead of a pH adjustor, had a higher D90/D10 value than the glass raw material granules of Examples 1 to 7, and the degree of the distribution of the particle size was large. Thus, the glass raw material powder was not sufficiently granulated. Further, as a result of visually observing the glass raw material granules of Comparative Example 1, fine particles which were not granulated were clearly contained.

Further, as compared to the glass raw material granules of Examples 1 to 7, the glass raw material granules of Comparative Example 1 had a lower correlation coefficient, and the strength of the glass raw material granules of Comparative Example 1 was poor.

Further, as compared to the glass raw material granules of Examples 1 to 7, the glass raw material granules of Comparative Example 2 prepared by using a pH adjustor having a pH of 8.2 had a higher D90/D10 value and a larger distribution of the particle size. Thus, the glass raw material powder was not sufficiently granulated. Further, as a result of visually observing the glass raw material granules of Comparative Example 2, fine particles which were not granulated were clearly included.

As compared to the glass raw material granules of Examples 1 to 7, the glass raw material granules of Comparative Examples 3 and 4 of which the content of boric acid in the glass raw material powder was insufficient at a level of 6 mass % had a higher D90/D10 value and a larger distribution of the particle size. Thus, the glass raw material powder was not sufficiently granulated. Further, as a result of visually observing the glass raw material granules of Comparative Examples 3 and 4, fine particles which were not granulated were clearly contained.

Further, as compared to the glass raw material granules of Examples 1 to 7, the glass raw material granules of Comparative Examples 3 and 4 had a lower correlation coefficient and low strength.

INDUSTRIAL APPLICABILITY

The glass raw material granules prepared by the production process of the present invention have a sufficient strength as glass raw material granules to be used for producing glass, and when melting the glass raw material granules, the formation of a large amount of fine powders due to collapse of granules can be prevented. Accordingly, even though the glass raw material granules prepared by the process of the present invention are pneumatically conveyed to a gas phase atmosphere, fine powders are not likely to be formed. Thus, the glass raw material granules of the present invention can be preferably used for producing glass by means of the in-flight melting method and other glass productions using a glass melting furnace.

This application is a continuation of PCT Application No. PCT/JP2011/070902, filed on Sep. 13, 2011, which is based upon and claims the benefit of priority from Japanese Patent Application No. 2010-213834 filed on Sep. 24, 2010. The contents of those applications are incorporated herein by reference in its entirety.

What is claimed is:

1. A process for producing glass raw material granules, comprising:
    adding boric acid to at least one of or a glass raw material powder and an alkaline solution having a pH of at least 9; and
    mixing the glass raw material powder together with the alkaline solution after the addition of boric acid to obtain a glass raw material powder mixture; and
    granulating the glass raw material powder mixture to form the glass raw material granules;
    wherein the mixing and granulating are conducted by tumbling granulation;
    wherein the glass raw material powder is a borosilicate glass, comprising as represented by mass percentage based on oxides
    $SiO_2$: from 40 to 85 mass %,
    $Al_2O_3$: from 1 to 22 mass %,
    $B_2O_3$: from 2 to 20 mass %,
    MgO: from 0 to 8 mass %,
    CaO: from 0 to 14.5 mass %,
    SrO: from 0 to 24 mass %,
    BaO: from 0 to 30 mass %,
    and $R_2O$: from 0 to 10 mass % wherein R is an alkali metal.

2. The process according to claim 1, wherein a content of boric acid in the at least one of the glass raw material powder and the alkaline solution having a pH of at least 9 is at least 10 mass % based on a total amount of the glass raw material powder and/or the alkali solution to which the boric acid is added.

3. The process according to claim 1, wherein the boric acid is added to the glass raw material powder, and a content of the boric acid is at least 10 mass % of based on the glass raw material powder.

4. The process according to claim 1, wherein the alkaline solution is sprayed to the glass raw material powder during the mixing.

5. The process according to claim 1, further comprising: of drying the formed glass raw material granules.

6. The process according to claim 1, wherein an average particle size of the glass raw material granules is from 50 to 1,000 μm.

7. The process according to claim 1, wherein the content of the $R_2O$ is 0.1% or less.

8. A process for producing glass raw material granules, comprising:
    mixing and granulating a glass raw material powder containing comprising boric acid together with an alkaline solution having a pH of at least 9;
    wherein the mixing and granulating are conducted by tumbling granulation
    wherein the glass raw material powder is a borosilicate glass, comprising as represented by mass percentage based on oxides
    $SiO_2$: from 40 to 85 mass %,
    $Al_2O_3$: from 1 to 22 mass %,
    $B_2O_3$: from 2 to 20 mass %,
    MgO: from 0 to 8 mass %,
    CaO: from 0 to 14.5 mass %,
    SrO: from 0 to 24 mass %,
    BaO: from 0 to 30 mass %,
    and $R_2O$: from 0 to 10 mass % wherein R is an alkali metal.

9. A process for producing a glass product, comprising:
    heating the glass raw material granules produced by the process as defined in claim 1 to form a glass melt;
    forming and solidifying the glass melt.

10. The process for producing a glass product according to claim 9, wherein heating the glass raw material granules to form a glass melt, comprises melting the glass raw material granules in a gas phase atmosphere to form molten glass particles, and collecting the molten glass particles to form a glass melt.

11. The process for producing a glass product according to claim 10, wherein the glass raw material granules are pneumatically conveyed and introduced to the gas phase atmosphere.

* * * * *